United States Patent
Gorajala Chandra et al.

(10) Patent No.: US 9,936,059 B2
(45) Date of Patent: Apr. 3, 2018

(54) MANAGEMENT OF WIRELESS ACCESS POINTS VIA VIRTUALIZATION

(71) Applicant: Fortinet, Inc., Sunnyvale, CA (US)

(72) Inventors: Sekhar Sumanth Gorajala Chandra, San Jose, CA (US); Chih-Hao Lee, Fremont, CA (US)

(73) Assignee: Fortinet, Inc., Sunnyvale, CA (US)

( * ) Notice: Subject to any disclaimer, the term of this patent is extended or adjusted under 35 U.S.C. 154(b) by 159 days.

(21) Appl. No.: 14/290,434

(22) Filed: May 29, 2014

(65) Prior Publication Data

US 2016/0241702 A1 Aug. 18, 2016

(51) Int. Cl.
| | |
|---|---|
| H04M 1/725 | (2006.01) |
| H04W 24/04 | (2009.01) |
| H04W 72/04 | (2009.01) |
| H04W 88/08 | (2009.01) |
| H04W 88/12 | (2009.01) |
| H04L 1/22 | (2006.01) |
| H04W 84/12 | (2009.01) |
| H04W 88/10 | (2009.01) |
| G06F 9/455 | (2018.01) |

(52) U.S. Cl.
CPC .......... *H04M 1/72533* (2013.01); *H04L 1/22* (2013.01); *H04W 24/04* (2013.01); *H04W 72/0433* (2013.01); *G06F 9/45558* (2013.01); *G06F 2009/45595* (2013.01); *H04W 84/12* (2013.01); *H04W 88/08* (2013.01); *H04W 88/10* (2013.01); *H04W 88/12* (2013.01)

(58) Field of Classification Search
CPC ..... H04W 84/12; H04W 84/20; H04W 88/10; H04W 88/12; H04W 88/08; H04W 16/02; H04W 72/0433; H04W 72/0406; H04W 12/08; H04L 12/24; H04L 67/34; H04L 41/042; H04L 41/044; H04L 41/046; H04L 41/06; H04L 41/08; H04L 67/1048; H04L 1/22; H04L 12/4641; H04L 49/70; H04L 45/586; H04L 63/0272; G06F 9/45558; G06F 2009/45595; G06F 9/45533; H04M 1/72533

See application file for complete search history.

(56) References Cited

U.S. PATENT DOCUMENTS

| | | | |
|---|---|---|---|
| 7,768,959 B1 * | 8/2010 | Chen ...................... G06F 9/455 | 370/310 |
| 9,256,416 B1 * | 2/2016 | Vemula ..................... G06F 8/61 | |
| 9,674,037 B2 * | 6/2017 | Gorajala Chandra ............. H04L 41/0823 | |
| 2008/0084855 A1 * | 4/2008 | Rahman ................. H04L 67/34 | 370/342 |

(Continued)

*Primary Examiner* — Olumide T Ajibade Akonai
(74) *Attorney, Agent, or Firm* — Hamilton, DeSanctis & Cha LLP

(57) ABSTRACT

Wireless access point (AP) and methods for providing wireless connectivity to wireless client are provided. According to one embodiment, a wireless AP includes a host hardware platform and a hypervisor for providing a first virtual machine where a first guest operating system (OS) is configured to run on the first virtual machine. A wireless module is configured to run on the first guest OS for managing the wireless connection to at least one wireless client. A wireless AP management console is configured to run on the wireless AP but outside the first guest OS and to manage operations of the wireless module and the first guest OS.

24 Claims, 13 Drawing Sheets

(56) References Cited

U.S. PATENT DOCUMENTS

| | | | |
|---|---|---|---|
| 2012/0011397 A1* | 1/2012 | Murakami | G06F 11/0712 |
| | | | 714/15 |
| 2014/0010171 A1* | 1/2014 | Morrill | H04W 88/10 |
| | | | 370/329 |
| 2014/0082240 A1* | 3/2014 | Coleman | G06F 9/4812 |
| | | | 710/260 |
| 2015/0249586 A1* | 9/2015 | Byers | H04L 43/0805 |
| | | | 709/224 |

* cited by examiner

MANAGEMENT OF WIRELESS ACCESS POINTS VIA VIRTUALIZATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2014, Fortinet, Inc.

BACKGROUND

1. Field

Embodiments of the present invention generally relate to the field of wireless network techniques. In particular, various embodiments relate to management of access points (APs) via virtualization.

2. Description of the Related Art

Wireless access points (APs) are deployed to cover public areas, offices and families so that Wi-Fi-enabled computing devices may be connected to a private network or the Internet through a wireless network. Wireless APs are usually mounted on the ceiling of a building or other relatively high places where Wi-Fi signals will not be blocked. When a large number of APs are deployed, the wireless APs are connected to a wireless AP controller (AC) and are managed by the AC. A control tunnel may be established and maintained between a wireless AP and an AC when the wireless AP is connected to the network. The AC may manage the configurations of the wireless APs and the network traffic from/to the APs based on its policies.

A wireless AP system may halt for various reasons, including, but not limited to, a software failure, such as a kernel crash, kernel panic, memory leak or a wireless module failure. When conventional wireless AP systems halt, they can no longer be remotely managed by the AC. In order to resume Wi-Fi service, one must perform a hard reset by cycling the power to the wireless AP at issue; however, this may not be an easy task due to the difficulty of physically accessing the wireless AP as a result of its mounting location or as a result of it being located remote from the AC, such as a different building or even a different city.

Therefore, there is a need for a solution that will maintain uninterrupted management access to a wireless AP from an AC even when the wireless AP has halted.

SUMMARY

Virtual wireless access points (APs) and methods for managing a virtual AP are described. According to one embodiment, a wireless AP includes a host hardware platform and a hypervisor for providing a first virtual machine where a first guest operating system (OS) is configured to run on the first virtual machine. A wireless module is configured to run on the first guest OS for managing the wireless connection to at least one wireless client. A wireless AP management console is configured to run on the wireless AP but outside the first guest OS and to manage operations of the wireless module and the first guest OS.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
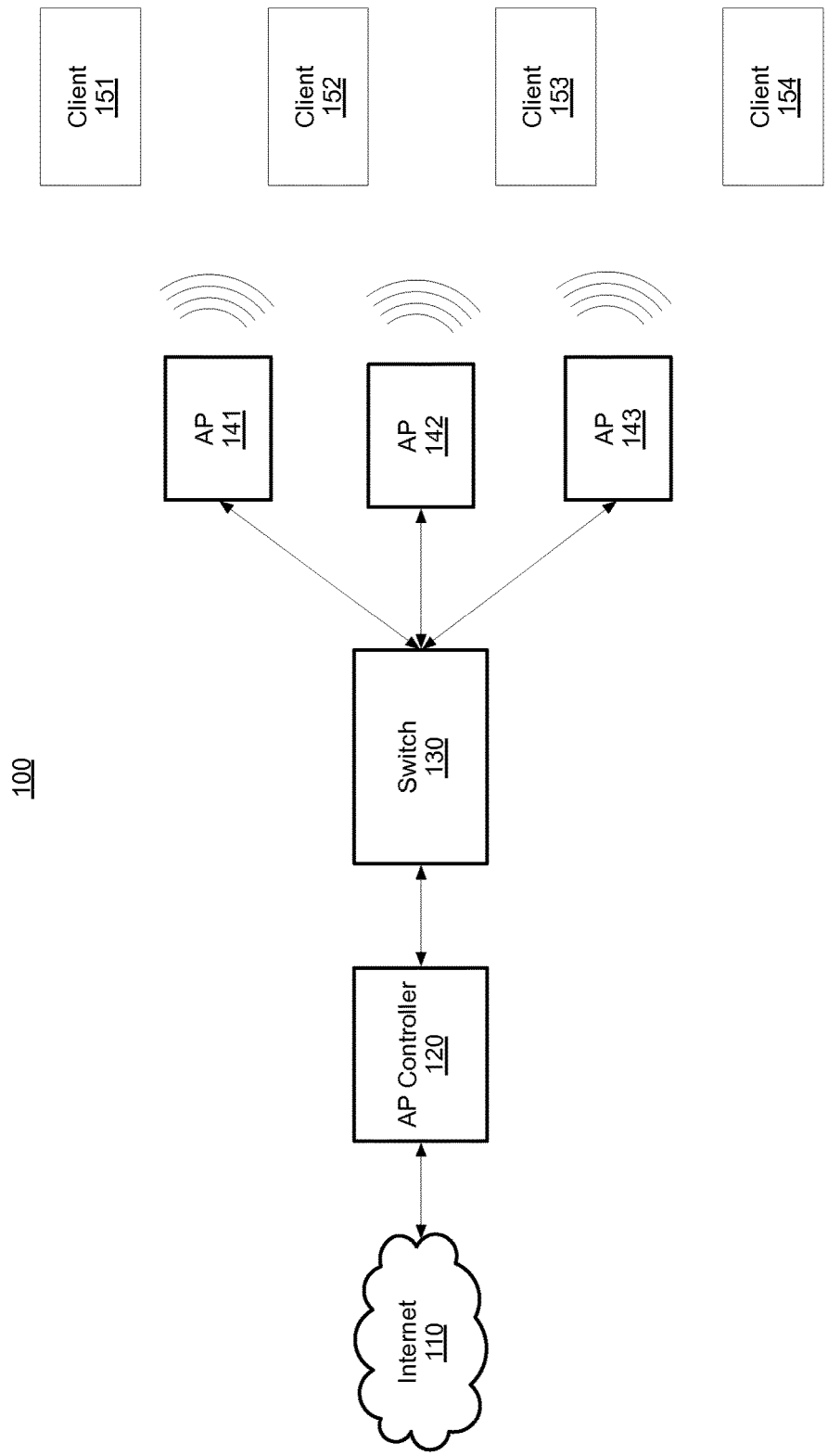
FIG. 1 illustrates exemplary network architecture in accordance with an embodiment of the present invention.

Virtual wireless access points (APs) and methods for managing a virtual AP are described. According to one embodiment, a hypervisor for providing a first virtual machine is configured on a hardware platform of a wireless AP. A first guest operating system (OS) is configured to run on the first virtual machine. A wireless module is configured to run on the first guest OS for managing the wireless connection to the at least one wireless client. A wireless AP management console is configured to run on the wireless AP but outside the first guest OS and to manage operations of the wireless module and the first guest OS.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

TERMINOLOGY

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWI-FI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrase "security device" generally refers to a hardware device or appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management. load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

FIG. 1 illustrates an exemplary network architecture 100 in accordance with an embodiment of the present invention. In the present example, network 100 includes a wireless AP controller (AC) 120 that is connected to the Internet 110. Multiple APs, such as wireless AP 141-143, may be connected to wireless AP directly or through a switch 130. Wi-Fi-enabled clients (151-154) may connect to any wireless AP (141-143) when within coverage of the APs. In the present example, APs 141-143 may be thin APs that have wireless AP functions only at the APs side while the management functions are handled by AC 120. When APs 141-143 are connected to network 100, management channels, such as Control And Provisioning of Wireless Access Points (CAPWAP) command tunnels, are established between APs 141-143 and AC 120. AC 120 may distribute operating system images and/or configuration settings to APs. AC 120 may also manage the traffic transferred from/to APs 141-143 based on policies.

Although APs 141-143 as shown in FIG. 1A are thin APs that are controlled by AC 120, the wireless AP of present invention may be a fat wireless AP that has sufficient program logic and processing power to allow it to enforce policies relating to access and usage. The structure of an exemplary wireless AP will be described below with reference to FIG. 2.

Figure 2:
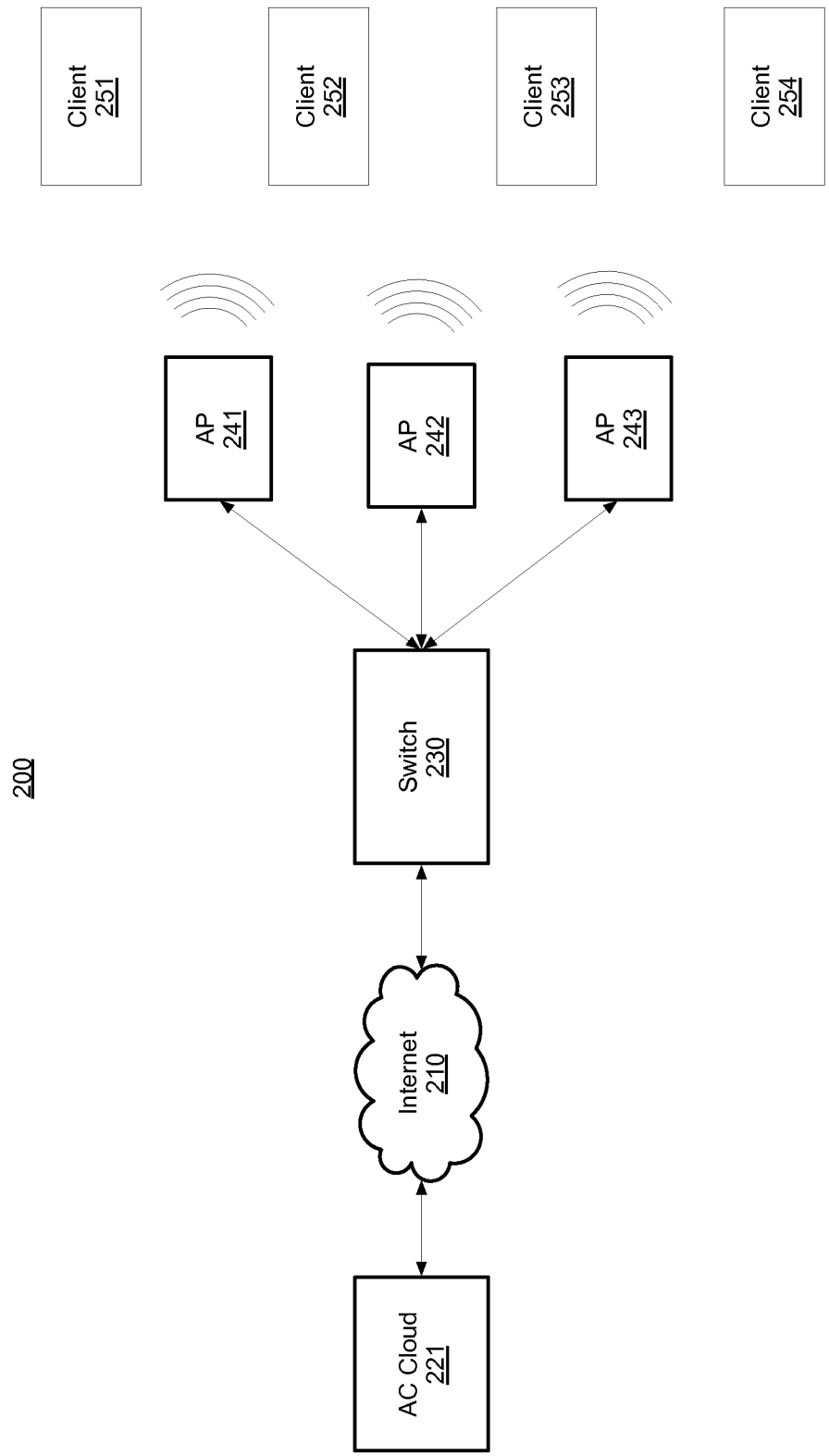
FIG. 2 illustrates exemplary network architecture in accordance with another embodiment of the present invention.

FIG. 2 illustrates an exemplary network architecture 200 in accordance with another embodiment of the present invention. In this example, network 200 includes an AC cloud 221, which is a cluster of ACs that may be deployed at different locations. When an AP is connected to the network 200, an AC of AC cloud 221 that is nearest to the AP may establish a tunnel with the AP across the Internet and manage the AP from cloud. In the present embodiment, the same or similar parts are designated with similar reference numbers as in the embodiment shown in FIG. 1 with the exception that the hundreds place of the corresponding reference numbers in FIG. 2 is a 2 rather than a 1. For brevity, further description of the previously described functional units is omitted.

When APs are managed from cloud, the administrator of the AC cloud usually cannot reach the APs, which may be located in different cities. It is beneficial to run an AP in a virtual machine and keep a control module on the AP but outside of the virtual machine. When the AP cannot be accessed by the AC from the cloud, the AC cloud may control the AP through the control module from outside the virtual machine.

Figure 3:
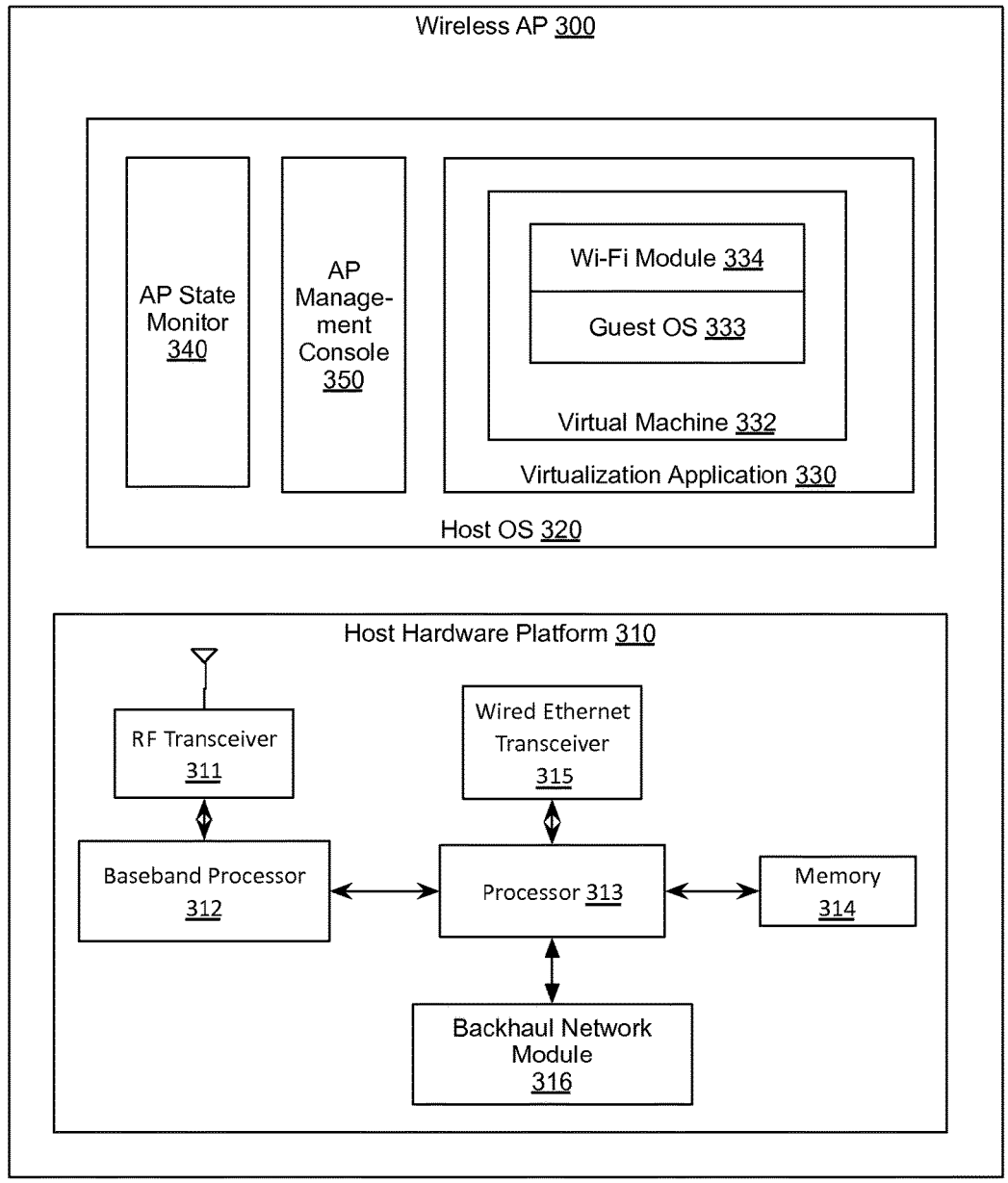
FIG. 3 illustrates exemplary functional units of a wireless access point with a virtual machine on a hosted hypervisor in accordance with an embodiment of the present invention.

FIG. 3 illustrates exemplary functional units of a wireless access point 300 with a virtual machine 323 on a hosted hypervisor in accordance with an embodiment of the present invention. In the present embodiment, wireless AP 300 comprises a host hardware platform 310 and a host OS 320. Host hardware platform 310 may comprise a radio frequency (RF) transceiver 311, a baseband processor 312, a processor 313, a memory 314, a wired Ethernet transceiver 315 and a backhaul network module 316. Processor 313 controls the operations of wireless AP 300 that relay data between connected wireless devices and a connected network. A tunnel, such as a CAPWAP tunnel, may also be established between wireless AP 300 and an AC so that wireless AP 300 may be managed from a remote point in a secure manner. Applications of the L2 and L3 layers may be loaded from memory 314 and executed by processor 313. It will be apparent to one skilled in the art that processors from manufacturers, such as Intel, AMD, ARM or the like may be used.

Baseband processor 312 is used for carrying out baseband processing on data received or to be sent by radio frequency (RF) transceiver 311. Baseband processor 312 may be a chip that manages the radio functions of wireless AP 300.

RF transceiver 311 may provide, on a single semiconductor integrated circuit, a receiver circuit for each of a plurality of antennas and a transmit circuit for each of the plurality of antennas. Each receiver circuit down converts the RF signal detected by its associated antenna to a baseband signal and each transmit circuit up converts a baseband signal to be transmitted by an assigned antenna.

Wired Ethernet transceiver 315 is an interface with a Local Area Network (LAN) to which wireless AP 300 is connected. Ethernet transceiver 315 connects to the LAN through a wired connection so that the wireless devices connected to wireless AP 300 through wireless channels may share the wired connection. Data packets between the wireless connected device and the LAN may be transferred through wired Ethernet transceiver 315. It will apparent to one skilled in the art that the units providing wireless connection (such as RF transceiver 311, baseband processor 312) and the units providing wired connection may be integrated into one chip to provide a highly integrated solution for wireless AP.

Backhaul network module 316 may be used as a secondary connection for providing connectivity to the Internet when the primary wired connection is broken. However, it is also possible that backhaul network module 316 may be a primary connection to the Internet. Backhaul network module 316 may be a 3G/4G Universal Serial Bus (USB) dongle that is inserted into USB port of wireless AP 300 so that wireless AP 300 may be connected to the Internet through wireless mobile communication network.

Host OS 320 is used for managing entire host hardware platform 310 and providing common services for programs running on host OS 320, such as wireless AP state monitor 340, wireless AP management console 350 and virtualization application 330. In other embodiments, host hardware platform 310 may manage the basic hardware of wireless AP 300, such as processor 313, memory 314, wired Ethernet transceiver 315, backhaul network module 316 and the like and the hardware associated with Wi-Fi communication with clients is managed by guest OS 333. Examples of host operating system include, but are not limited to, Windows, Mac OS, UNIX and Linux.

Virtualization application 330 is used for creating and running virtual machines on the host machine. Virtualization application may allocate a part of the host machine's resources for running each of the virtual machines on host OS 320. Virtualization application 330 may be VirtualBox, VMWare Workstation (VMWare is a registered trademark of VMWare Inc.), VMWare Fusion, Parallels (Parallels is a registered trademark of Parallels Software International, Inc.), QEMU, Windows Virtual PC (Windows is a registered trademark of Microsoft Inc.), Xen (Xen is a registered trademark of Citrix) or the like. In one embodiment of the present invention, host OS 320 may be a thin OS that needs only a few resources for hosting virtualization application 330 while most of the resources of the host machine may be assigned to the virtual machine and the guest OS of wireless AP 300. For example, 80 percent of the CPU, memory, storage and other hardware resources may be assigned to virtual machine 332 and guest OS 333 as the wireless connectivity of the wireless AP 300 are processed by Wi-Fi model 334 on guest OS 333 while only virtualization application 330, AP management console 350 and AP state monitor 340 are running on Host OS 320. In some other embodiments, if some wireless connectivity functions and connectivity to the AC are carried out on host OS 320, more resources may be reserved for host OS 320.

Virtual machine 332 is an operating environment created by virtualization application 330. Virtual machine 332 works in conjunction with, but independent of, host OS 320. In the present invention, guest OS 333 and Wi-Fi module 334 are running within virtual machine 332. Therefore, if a failure happens to Wi-Fi module 334, guest OS 333 or virtual machine 332 for any reason, host OS 320 may still be operating. When an AC loses connectivity with guest OS 333, the AC may connect to host OS 320 and reset the virtual machine 332, guest OS 333 and Wi-Fi module 334 without requiring physical access to the AP to cycle the power of the AP.

Guest OS 333 is an operating system that is running on virtual machine 332 within host OS 320. Examples of guest operating systems include, but are not limited to, Windows, Mac OS, UNIX and Linux. Guest OS 333 and host OS 320 may be same operating system or may be different operating systems. Guest OS 333 may manage the hardware of AP 300 associated with the Wi-Fi communication, such as baseband processor 312 and RF transceiver 311, and provide services to Wi-Fi module 334. Virtualization communication between host OS 320 and guest OS 333 can be implemented in many ways depending on the architecture. Virtualization application 330 may provide bridged networking or network address translation (NAT) networking so that virtual machine 332 may connect to the network to which wireless AP 300 is connected.

Bridged networking connects virtual machine 332 to a network to which wireless AP 300 is connected using the host machine's Ethernet adapter. In bridged networking, virtual machine 332 has its own identity on the network. Guest OS 333 may acquire an Internet Protocol (IP) address and other network details automatically from a Dynamic Host Configuration Protocol (DHCP) server of the network. Using bridged networking, virtual machine 332 is a full participant in the network and has access to other machines on the network and can be connected to other machines, such as the AC, on the network as if it was a physical computer on the network. In NAT networking, guest OS 333 and host OS 320 share a single network identity that is not visible outside the network. Virtual machine 332 shares the IP and Media Access Control (MAC) addresses of host OS 320 and uses the network connection of host OS 320 to access the network. Communications between an AC, host OS 320 and guest OS 333 will be described further below with reference to FIGS. 10 and 11.

Wi-Fi module 334 is an application that is arranged to run on guest OS 333. Wi-Fi module 334 may be used for providing Wi-Fi services to wireless clients and managing hardware associated with Wi-Fi communication of hardware platform 310, such as baseband processor 312 and RF transceiver 311. In some embodiment, wireless AP 300 is a thin wireless AP and Wi-Fi module 334 may establish a CAPWAP control channel with an AC while connected to the network so that wireless AP 300 may be managed by the AC. Wi-Fi module 334 may also establish a CAPWAP data channel over which CAPWAP data packets are sent or received by Wi-Fi module 334. In other embodiments, wireless AP 300 is a fat wireless AP and Wi-Fi module 334 may also manage user authentication, user sessions, etc.

Returning to host OS 320, wireless AP management console 350 that resides on guest OS 333 is used for managing Wi-Fi module 334 and guest OS 333 from host OS 320.

Wi-Fi module 334 may comprise its own management console that can be accessed and controlled from the AC through a CAPWAP control channel. The AC may send a heartbeat request to Wi-Fi module 334 periodically through the CAPWAP control channel. If no heartbeat response is received within a certain timeframe, the AC may determine that the Wi-Fi service of AP 300 has stopped and Wi-Fi module 334 may not be controlled from the AC. For example, Wi-Fi module 334 may crash or stop working due to some hardware or software problems. Guest OS 333 may stop working due to a kernel crash, a kernel panic or a memory leak. If the AC cannot control Wi-Fi module 334 on the guest OS 333, the AC may connect to wireless AP management console 350 residing on host OS 320 (which is still active) and control the Wi-Fi module 334 or virtual machine 332 from host OS 320. For example, the AC may send a reset command to wireless AP management console 350. Then, wireless AP management console 350 may reset virtual machine 332 using power management tools or a corresponding application programming interface (API) provided by virtualization application 330. The AC may also send debug commands or a log transfer command to wireless AP management console 350 when the AC has lost connectivity to guest OS 333. Wireless AP management console 350 may perform debug commands through a command line interface of guest OS 333 or retrieve a corresponding log of guest OS 333 or Wi-Fi module 334 and transfer the result of the debug or the log back to the AC. The administrator of the wireless network may find out the source of the failure or resume the Wi-Fi services after a failure of the AP is detected.

Host OS 320 may further comprise a wireless AP state monitor 340 that is used for monitoring the operation of virtual machine and Wi-Fi module 334. For example, wireless AP state monitor 340 may detect the heartbeat status of guest OS 333. If no heartbeat is detected, wireless AP state monitor 340 may determine that guest OS 333 has stopped responding and Wi-Fi module 334 has stopped providing Wi-Fi service. Then, wireless AP state monitor may send a reset command to wireless AP management console 350 and wireless AP management console 350 may reset virtual machine 332 and guest OS 333 so that Wi-Fi module 334 may restart.

Figure 4:
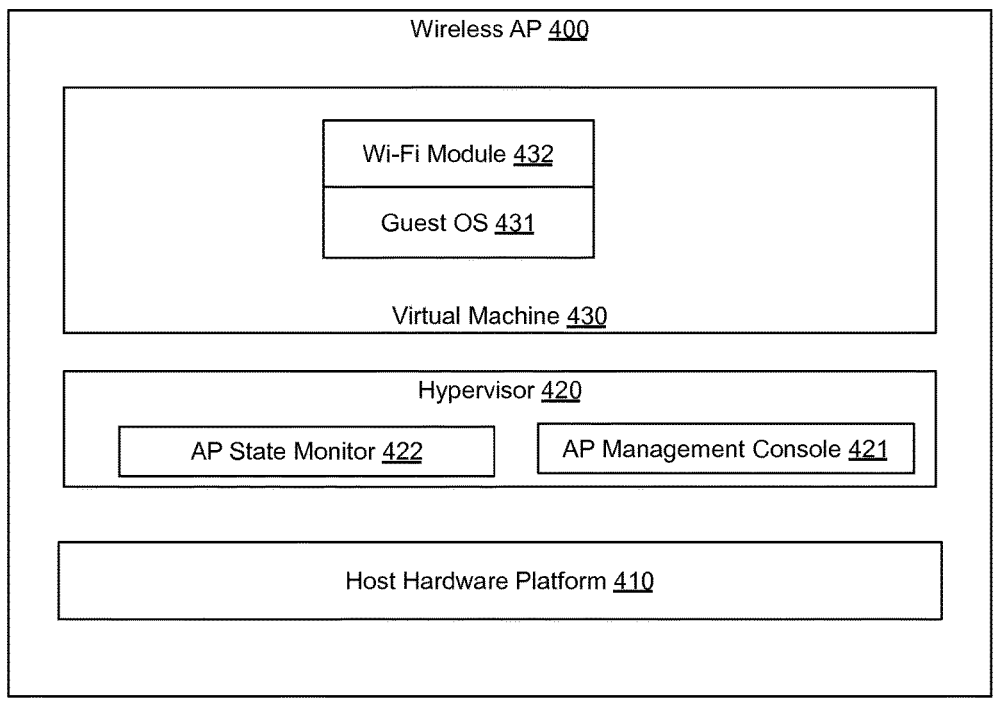
FIG. 4 illustrates exemplary functional units of a wireless access point with a virtual machine on a bare metal hypervisor in accordance with an embodiment of the present invention.

FIG. 4 illustrates exemplary functional units of a wireless access point 400 with a virtual machine on a bare metal hypervisor 420 in accordance with an embodiment of the present invention. In present embodiment, wireless AP 400 comprises a host hardware platform 410 that can be the same as host hardware platform 310 as shown in FIG. 3. Wireless AP 400 further comprises a hypervisor 420 that provides virtual computing environment directly on top of hardware. Hypervisor 420 may be a bare-metal hypervisor that manages multiple virtual machines and guest operating systems. As those of ordinary skill in the art will appreciate, hypervisor 420 may be one of may available bare-metal hypervisors, including, but not limited to, VMWare vSphere ESXi, Parallel Server Bare Metal, Xen Hypervisor or the like.

In the present embodiment, a virtual machine 430 is an operating environment created by hypervisor 420 and a guest OS 431 may run on virtual machine 430. Wi-Fi module 432 which may run on guest OS 431 provides Wi-Fi service to Wi-Fi-enable clients. Wi-Fi module 432 may connect to an AC through a virtual switch provided hypervisor 420 and CAPWAP control channel and data channel may be established between Wi-Fi module 432 and the AC.

In the present embodiment, a wireless AP management console 421 that may be used for managing Wi-Fi module 432 resides in hypervisor 420. When an AC detects that Wi-Fi module 432 has stopped responding, the AC may connect to wireless AP management console 421 and send a reset command to reset virtual machine 430. Wireless AP management console 421 may reset virtual machine 430 by a corresponding virtual machine reset API. After the virtual machine is reset, guest OS 431 and Wi-Fi module 432 restart and Wi-Fi service is resumed.

To determine if Wi-Fi module 432 is working properly, a wireless AP state monitor 422 may be used to monitor the state of virtual machine 430. The state of virtual machine 430 may be detected by virtual machine introspection (VMI) tools provided by hypervisor 420. When wireless AP state monitor 422 detects that virtual machine 430 has stopped, wireless AP management console 421 may reset it to resume Wi-Fi service.

Figure 5:
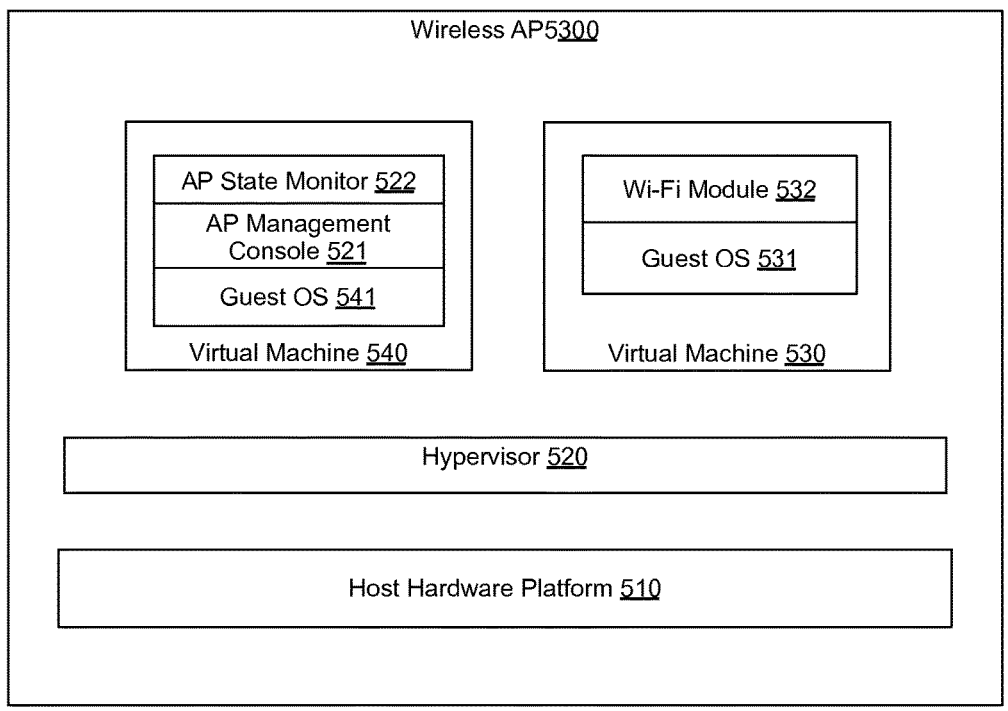
FIG. 5 illustrates exemplary functional units of a wireless access point with a virtual machine on a bare metal hypervisor in accordance with another embodiment of the present invention.

FIG. 5 illustrates exemplary functional units of a wireless access point 500 with virtual machines 530 and 540 on a bare metal hypervisor 520 in accordance with another embodiment of the present invention. In this embodiment, two virtual machines 530 and 540 may be running on top of hypervisor 520. Virtual machine 530 hosts Wi-Fi module 532 and another virtual machine 540 monitors the state of guest OS Wi-Fi module 532. A difference between the embodiments of FIG. 4 and FIG. 5 is that in the context of FIG. 5 wireless AP management console 521 and wireless AP state monitor 522 do not reside in hypervisor 520. Instead, wireless AP state monitor 522 and wireless AP management console 521 reside on guest OS 541. Wireless AP state monitor 522 may use VMI provided by hypervisor 520 to monitor the state of virtual machine 530 from virtual machine 540. When Wi-Fi module 532 halts, virtual machine 530 may be reset and Wi-Fi service may be resumed. As virtual machine 540 is used only for monitoring the state of virtual machine 530, virtual machine 540 may be a light virtual machine and most of the resources of wireless AP 500 may be allocated to virtual machine 530 by hypervisor 520.

Figure 6:
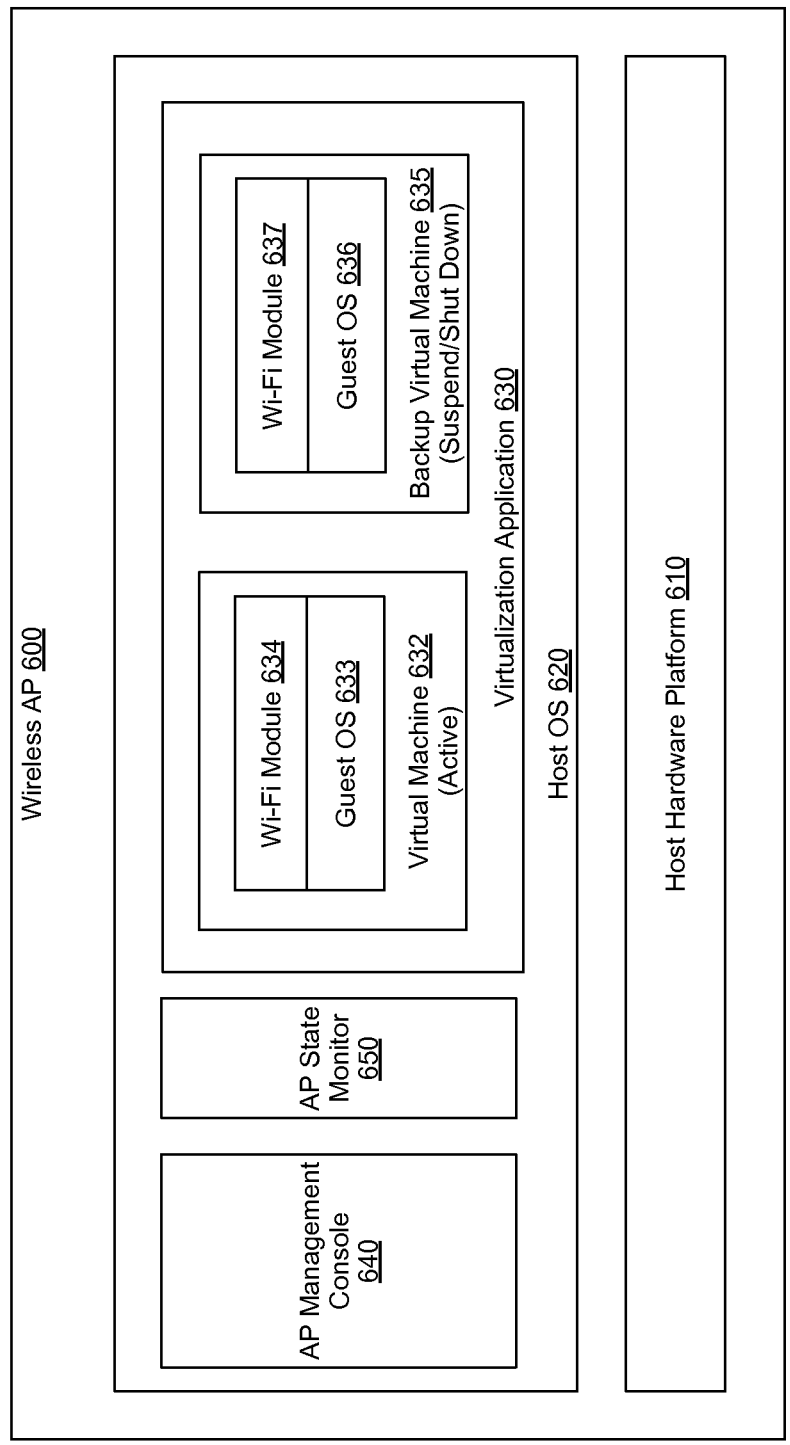
FIG. 6 illustrates exemplary functional units of a wireless access point with an active virtual machine and a backup virtual machine in accordance with an embodiment of the present invention.

FIG. 6 illustrates exemplary functional units of a wireless access point 600 with an active virtual machine 632 and a backup virtual machine 635 in accordance with an embodiment of the present invention. In the present embodiment, the same or similar parts are designated with similar reference numbers as in the embodiment shown in FIG. 3 with the exception that the hundreds place of the corresponding reference numbers in FIG. 6 is a 6 rather than a 3. For brevity, further description of the previously described functional units is omitted.

In addition to the components described with reference to FIG. 3, wireless AP 600 includes backup virtual machine 635 that is a copy or clone of virtual machine 632. When virtual machine 632 is running (active), backup virtual machine 635 is in a suspended or a shut down state. When virtual machine 632 or Wi-Fi module 634 halts, an AC may send a reset command to wireless AP management console 621 to resume the Wi-Fi service. Wireless AP management console 621 may power off virtual machine 632 and concurrently power on backup virtual machine 635. By powering on a backup virtual machine and running Wi-Fi module on a new guest OS, the Wi-Fi service may be resumed more quickly than resetting the halted virtual machine 632 because powering off the halted virtual machine and powering on a new virtual machine are executed in parallel.

Figure 7:
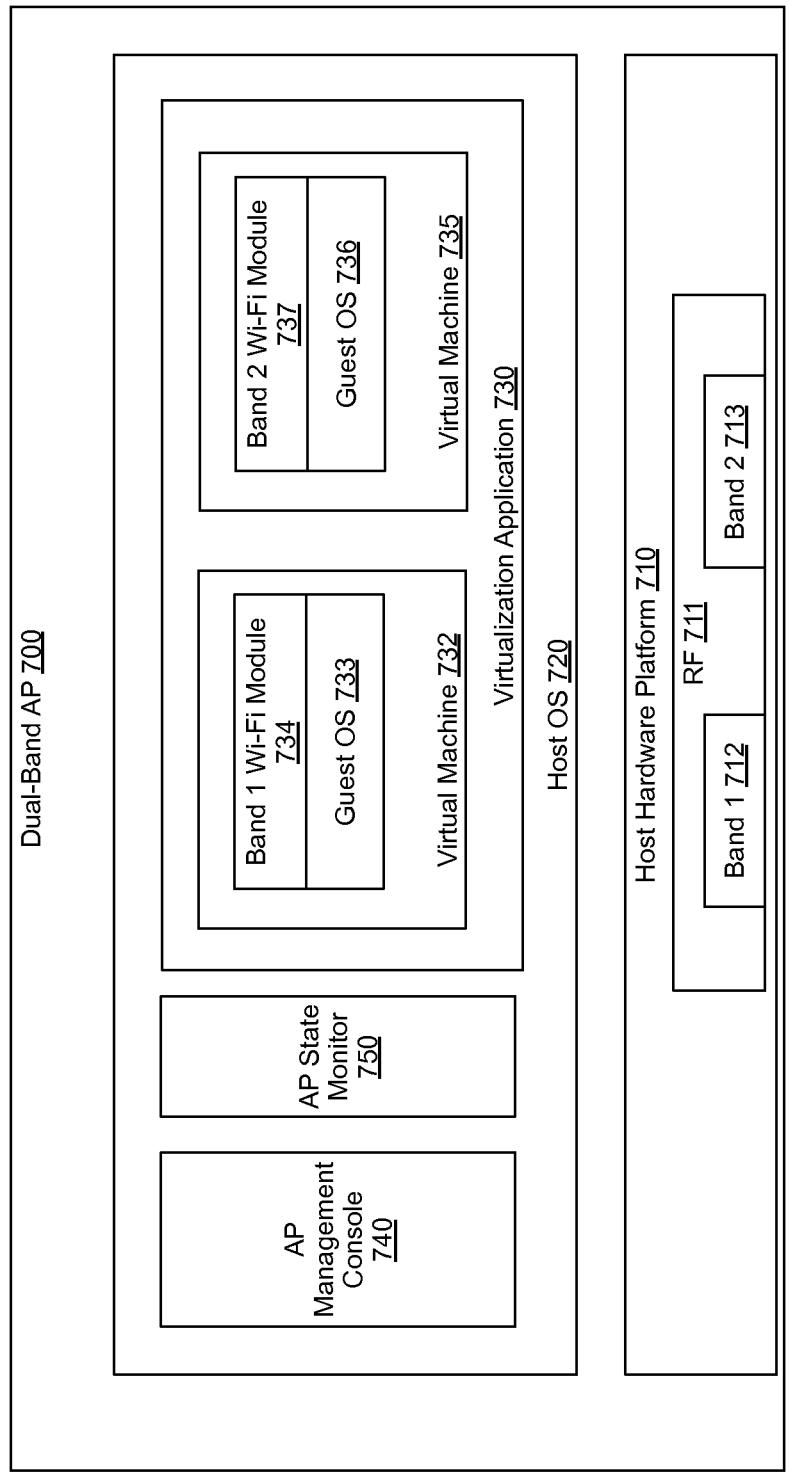
FIG. 7 illustrates exemplary functional units of a two-band wireless access point with two virtual machines accordance with an embodiment of the present invention.

FIG. 7 illustrates exemplary functional units of a two-band wireless access point 700 with two virtual machines 732 and 735 in accordance with an embodiment of the present invention. In the present embodiment, wireless AP 700 includes a host hardware platform 710 and a host OS 720. A radio frequency (RF) unit 711 of host hardware platform 710 includes a band 1 antenna 712 and a band 2 antenna 713 so that dual-band wireless AP 700 may operate on two radio frequencies, such as 2.4 GHz band and 5 GHz band, concurrently. Host OS 720 comprises a virtualization application 730, a wireless AP management console 740 and a wireless AP state monitor 750. On virtualization application 730, virtual machine 732 is created and a guest OS 733 may run on virtual machine 732. A Wi-Fi module 734 managing the band 1 Wi-Fi services may run on guest OS 733. Another virtual machine 735 is also created within virtual application 730 and a guest OS 736 may run on virtual machine 735. Another Wi-Fi module 737 managing the band 2 Wi-Fi services may run on guest OS 736. Wireless AP state monitor 750 may monitor the states of virtual machines 732 and 735 and Wi-Fi modules 734 and 737. Wireless AP management console 740 may manage the running of virtual machines 732 and 735 and Wi-Fi modules 734 and 737 based on the states of virtual machines or commands received from an AC. When the service on one band is stopped on one virtual machine, the services on other band which is on the other virtual machine are not affected. The halted virtual machine may be reset by the host OS to resume the services on that band. By running two Wi-Fi modules that manage two bands of Wi-Fi service separately on two virtual machines, wireless AP 700 may provide uninterrupted dual-band Wi-Fi connection to clients concurrently.

Figure 8:
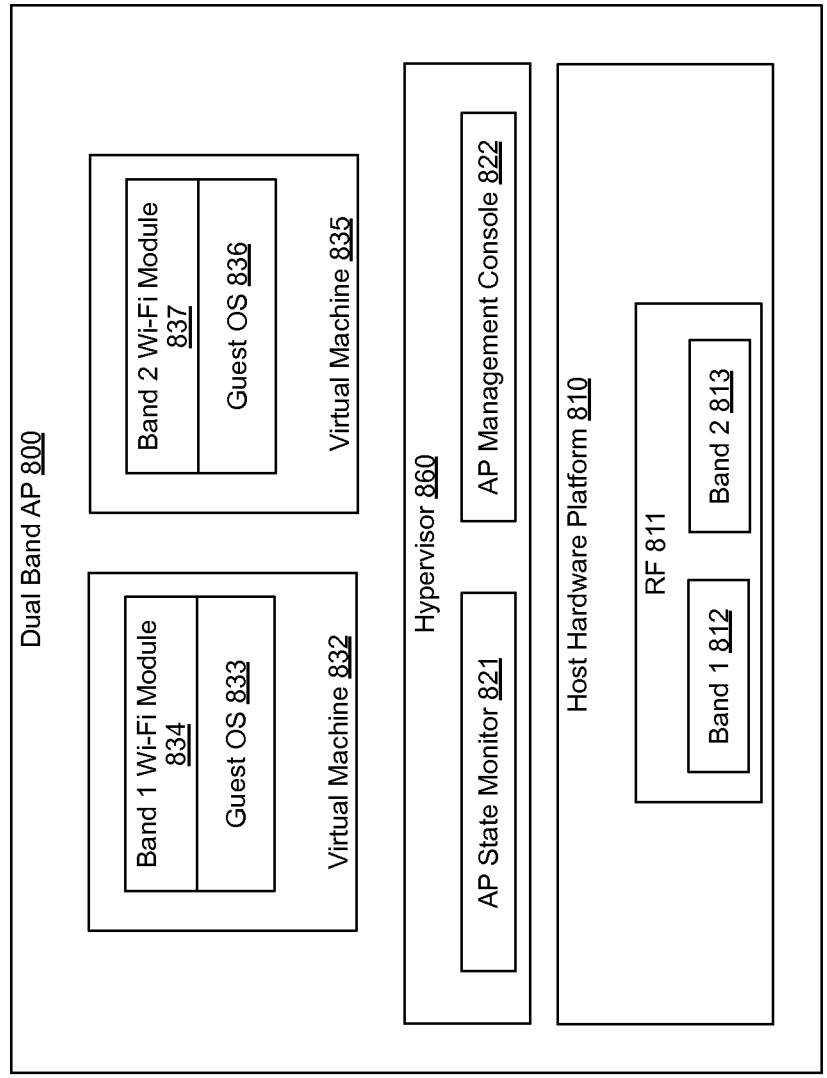
FIG. 8 illustrates exemplary functional units of a two-band wireless access point with two virtual machines accordance with another embodiment of the present invention.

FIG. 8 illustrates exemplary functional units of a two-band wireless access point 800 with two virtual machines 832 and 835 in accordance with another embodiment of the present invention. In the present embodiment, the same or similar parts are designated with similar reference numbers as in the embodiment shown in FIG. 7 with the exception that the hundreds place of the corresponding reference numbers in FIG. 8 is an 8 rather than a 7. For brevity, further description of the previously described functional units is omitted.

In this embodiment, a dual-band wireless AP 800 comprises a hypervisor 860, which may be a bare-metal hypervisor, and two virtual machines 832 and 835 created on hypervisor 860. The Wi-Fi service of each band is managed by a Wi-Fi module that is running on an independent virtual machine while wireless AP state monitor 850 and wireless AP management console 840 reside on hypervisor 850.

Figure 9:
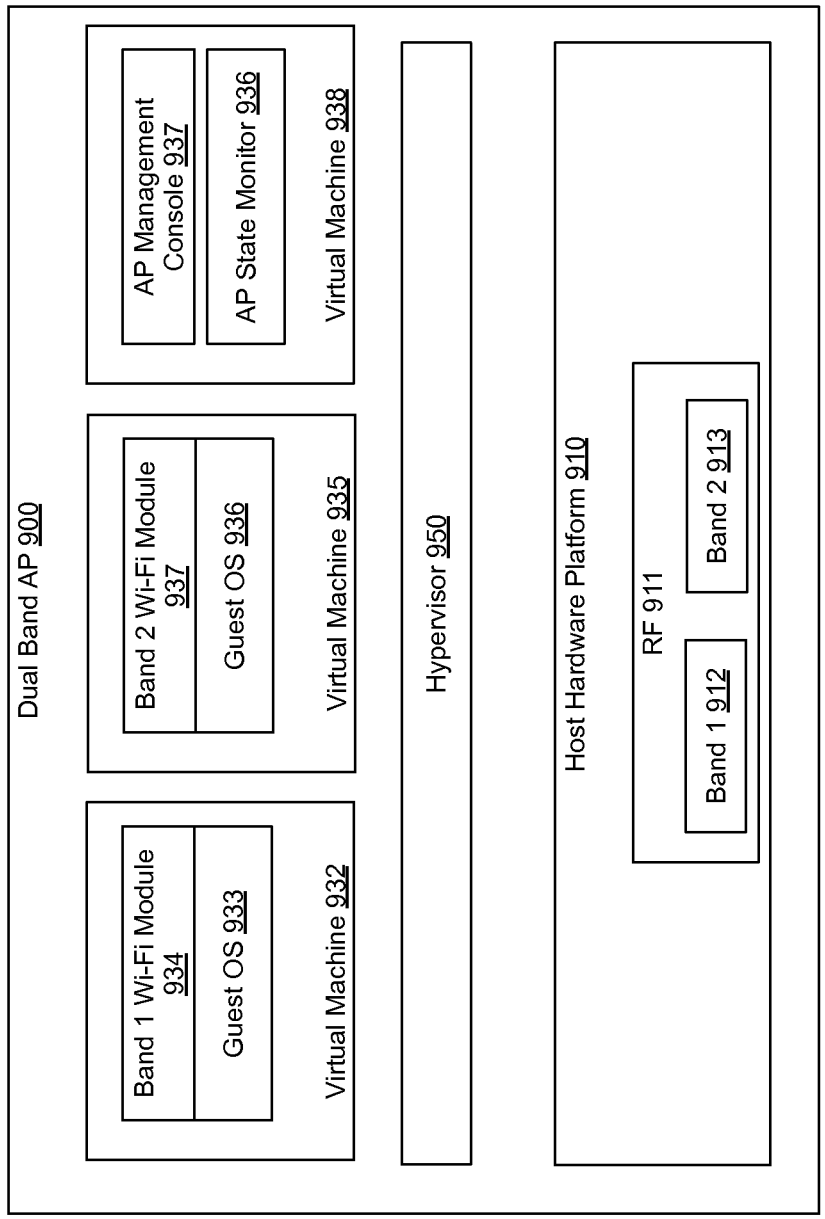
FIG. 9 illustrates exemplary functional units of a two-band wireless access point with three virtual machines accordance with a further embodiment of the present invention.

FIG. 9 illustrates exemplary functional units of a two-band wireless access point 900 with three virtual machines 952, 935 and 938 in accordance with another embodiment of the present invention. In the present embodiment, the same or similar parts are designated with similar reference numbers as in the embodiment shown in FIG. 8 with the exception that the hundreds place of the corresponding reference numbers in FIG. 9 is a 9 rather than an 8. For brevity, further description of the previously described functional units is omitted.

In this embodiment, a dual-band wireless AP 900 comprises a hypervisor 950 which is a bare-metal hypervisor and three virtual machines 932, 935 and 938 may be created on hypervisor 950. The Wi-Fi service of each band is managed by Wi-Fi modules that are running on independent virtual machines 932 and 935 while wireless AP state monitor 950 and wireless AP management console 940 reside on a third virtual machine 938. As virtual machine 938 is used for monitoring other virtual machines hosting Wi-Fi modules that provide wireless connectivity to Wi-Fi-enabled clients, most resources of wireless AP 900 may be allocated to the virtual machines 932 and 935 that host Wi-Fi modules and virtual machine 938 that hosts wireless AP state monitor 936 and wireless AP management console 937 may be a thin virtual machine.

Figure 10:
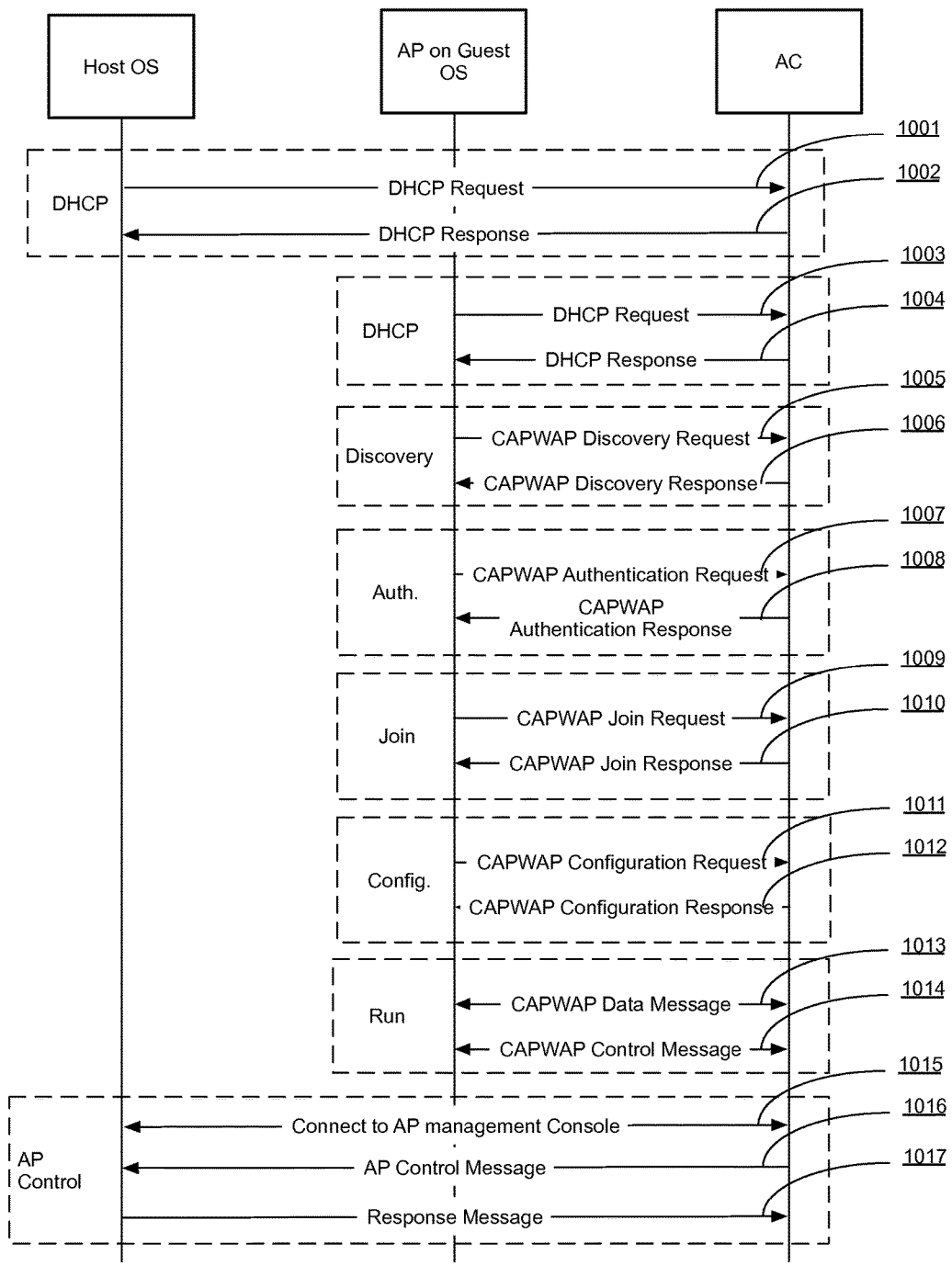
FIG. 10 is a sequence chart illustrating the interactions between an AC, a host OS and a guest OS in accordance with an embodiment of the present invention.

FIG. 10 is a sequence chart illustrating interactions between an AC, a host OS and a guest OS in accordance with an embodiment of the present invention. In this embodiment, a wireless AP connects to a AC through a network and a private IP address is assigned to a host OS of the wireless AP and another private IP address is assigned to a guest OS of the wireless AP by an DHCP server of the network or a DHCP server that is integrated with the AC.

At step 1001, when the wireless AP is connected to the network, a DHCP client of the host OS initiates a DHCP request to a DHCP server of the network. Then, at step 1002, the DHCP server sends a DHCP response to the AP. The DHCP server assigns a private IP address and other network parameters to the host OS in a DHCP response. After an IP address is assigned to the host OS, the host OS of the wireless AP may be accessed by the AC.

At step 1003, the guest OS of the wireless AP initiates a DHCP request to the DHCP server when the AP is connected to a network. Then, at step 1004, the DHCP server sends a DHCP response to the guest OS. The DHCP server assigns a private IP address and other network parameters to the guest OS in a DHCP response. After an IP address is assigned to the guest OS, the guest OS of the wireless AP may be accessed by the AC and a CAPWAP connection may be established between the wireless AP and the AC.

In step 1005, a Wi-Fi module on the guest OS initiates a CAPWAP discovery request. This may be a standard step of CAPWAP. The CAPWAP discovery request is used for establishing an initial CAPWAP connection between the guest OS and the AC. CAPWAP discovery request messages may be sent by the guest OS in the discover state after waiting for a random delay less than a max discovery interval, after the guest OS first comes up or is initialized. This is to prevent an explosion of CAPWAP discovery request messages. If a CAPWAP discovery response message is not received after sending the maximum number of CAPWAP discovery request messages, the guest OS enters a Sulking state and waits for an interval equal to a silent interval before sending further CAPWAP discovery request messages.

In step 1006, upon receiving a CAPWAP discovery request message, the AC responds with a CAPWAP discovery response message sent to the address in the source address of the received CAPWAP discovery request message. Once a CAPWAP discovery response is received, if the Wi-Fi module of the wireless AP decides to establish a session with the responding AC, it may perform an MTU discovery to obtain information regarding the maximum supported packet size.

In step 1007, a CAPWAP authentication request is sent by Wi-Fi module of the guest OS. Responsive thereto, in step 1008, a CAPWAP authentication response is sent by the AC. The authentication processing is used to setup a Datagram Transport Layer Security (DTLS) connection so that data packets between the AC and the wireless AP are encrypted and transmitted in a secure manner.

In step 1009, a CAPWAP join request is sent by the Wi-Fi module of the guest OS and a CAPWAP join response is sent by the AC in step 1010. The join processing is used by the guest OS to request service from the AC after a DTLS connection is established with the AC.

In step 1011, a CAPWAP configuration request is sent by the Wi-Fi module of the guest OS and a CAPWAP configuration response is sent by the AC in step 1012. In the configuration processing, the guest OS and AC exchange configuration information through the already established CAPWAP tunnel.

In step 1013, CAPWAP data messages are transmitted between the Wi-Fi module of the guest OS and the AC and CAPWAP control messages are transmitted between the Wi-Fi module of the guest OS and the AC in step 1014. For example, when an incoming data packet needs to be sent to a Wi-Fi-enabled client through the AP, the AC sends the incoming data packet as a data message through the CAPWAP data tunnel to the Wi-Fi module of the guest OS. Then, the incoming data packet is sent to the client through RF transceiver. When an outgoing data packet from a Wi-Fi-enabled client is received by the Wi-Fi module, it is transmitted to the AC as a data message through the CAPWAP data tunnel and the data packet is sent out of the network. Some control messages may also transmitted between the AC and the Wi-Fi module of the guest OS.

The operations shown in this embodiment is based on CAPWAP protocol and a CAPWAP tunnel is setup between the wireless AP and the AC. However, it is understood that the tunnel is used for establishing a connection between the wireless AP and the AC so that network conditions are hidden and data packets may be transferred in a safe manner. Other protocols, such as Datagram Transport Layer Security (DTLS) or Secure Socket Layer (SSL), may also be used for setting up the tunnel.

In step 1015, the AC may connect to wireless AP management console resides on the host OS when the AC cannot control the Wi-Fi module on the guest OS. In step 1016, the AC sends a control message to the wireless AP management console. The wireless AP management console may operate the guest OS based on the control message, such as reset the guest OS, debug the guest OS, transfer system log of the guest OS or power on a backup guest OS. The Wi-Fi service provided by the guest OS may be resume after the guest OS is restarted. In step 1017, a response message may be sent by the wireless AP management console to the AC to report the status of the guest OS after the guest OS is reset/powered on. When the guest OS is restarted or a new guest OS is powered on, the guest OS will repeat steps 1003-1014 where a private IP address may be acquired and a CAPWAP tunnel with the AC may be established again. The Wi-Fi services provided by the Wi-Fi module on the guest OS may be resumed.

Figure 11:
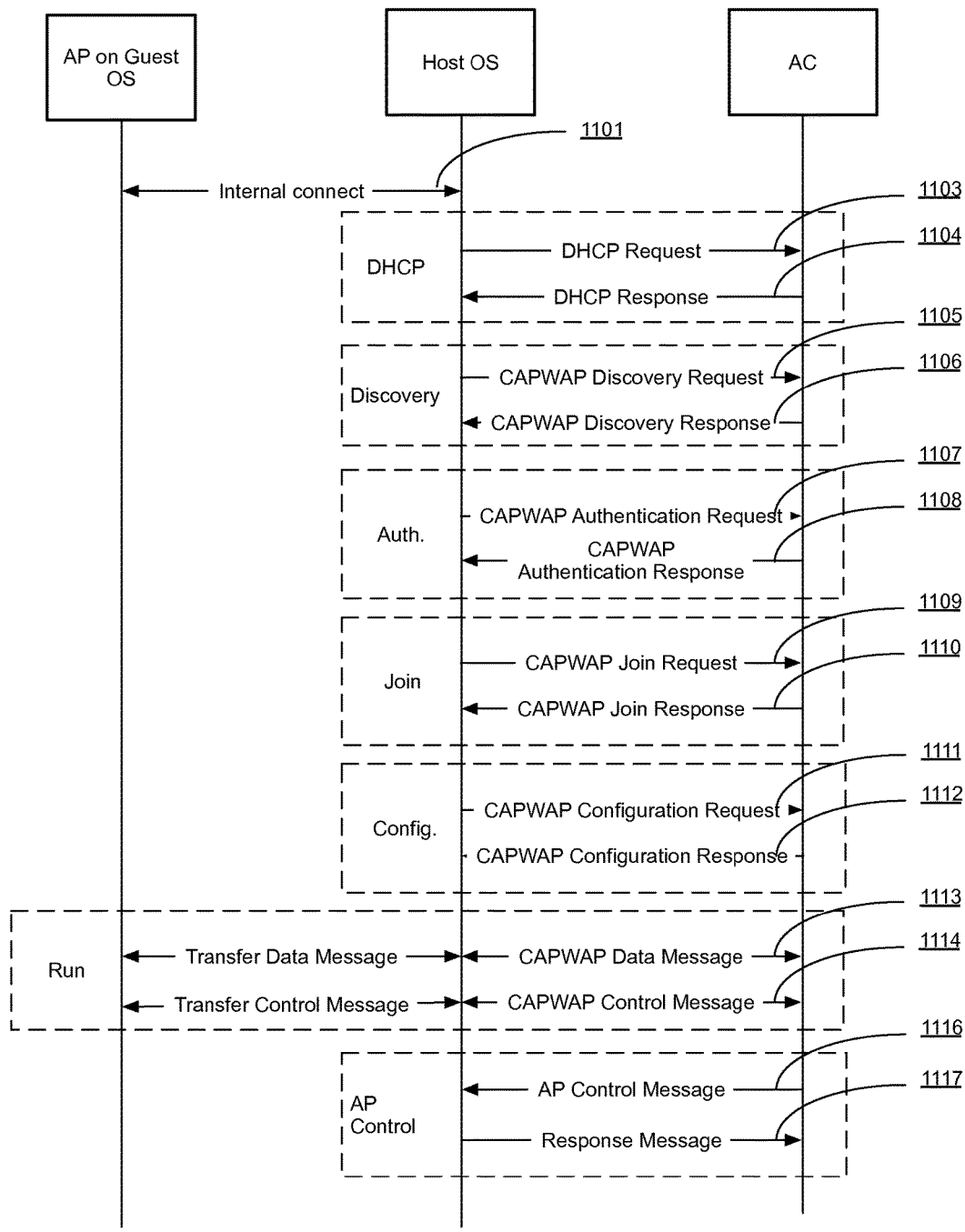
FIG. 11 is a sequence chart illustrating the interactions between an AC, a host OS and a guest OS in accordance with another embodiment of the present invention.

FIG. 11 is a sequence chart illustrating the interactions between an AC, a host OS and a guest OS in accordance with another embodiment of the present invention. In this embodiment, only the host OS of the wireless AP is assigned with an IP address by a DHCP server of the network or a DHCP server that is integrated with the AC. An internal connection is established between the host OS and the guest OS. The connection between a Wi-Fi module on the guest OS and the AC is proxied by the host OS.

At step 1101, a host OS and a guest OS of a wireless AP may establish an internal connection so that data packets may be transfer between the two system. For example, the host OS may setup a virtual switch or a NAT virtual adaptor and the host OS and the guest OS may communicate through the virtual switch or the NAT virtual adaptor.

Steps 1103-1112 of FIG. 11 are similar to steps 1003-1012 of FIG. 10. As such, a description of these steps is omitted for brevity. Notably, however, in present embodiment, an IP address is assigned to the host OS by a DHCP server and a CAPWAP connection is setup between the AC and the host OS, instead of the guest OS as shown in FIG. 10.

In step 1113, CAPWAP data messages are transmitted between the host OS and the AC. In step 1114, CAPWAP control messages are transmitted between the host OS and the AC. However, as the Wi-Fi module reside in the guest OS, the received CAPWAP data message and CAPWAP control message are forwarded to the Wi-Fi module through the internal connection between the host OS and the guest OS. For example, when an incoming data packet is received by an AC from a network, the AC sends the incoming data packet as a data message through the CAPWAP data tunnel to the host OS. The host OS may forward the data message (without decryption at the host OS) or the data packets (after decryption at the host OS) to the Wi-Fi module of the guest OS for process. Then, the Wi-Fi module of the guest OS may process the data packet and transmit the data packet to the Wi-Fi-enabled client through RF transceiver. When an outgoing data packet from a Wi-Fi-enabled client is received by the Wi-Fi module of the guest OS, it is transmitted to the host OS through the internal connection. The host OS may transfer the data packet to the AC as a CAPWAP data message through the CAPWAP data tunnel between the host OS and the AC. The data packet is then sent to the network by the AC. Some control messages may also transmitted between the AC and the Wi-Fi module of the guest OS via the host OS.

In step 1116, the AC send a control message to the wireless AP management console that resides on the host OS through the CAPWAP control tunnel between the host OS and the AC if the AC lost control to the Wi-Fi module on the guest OS. The wireless AP management console may operate the guest OS based on the control message. In step 1117, a response message may be sent by the wireless AP management console to the AC to report the status of the guest OS after the guest OS is reset/powered on.

Figure 12:
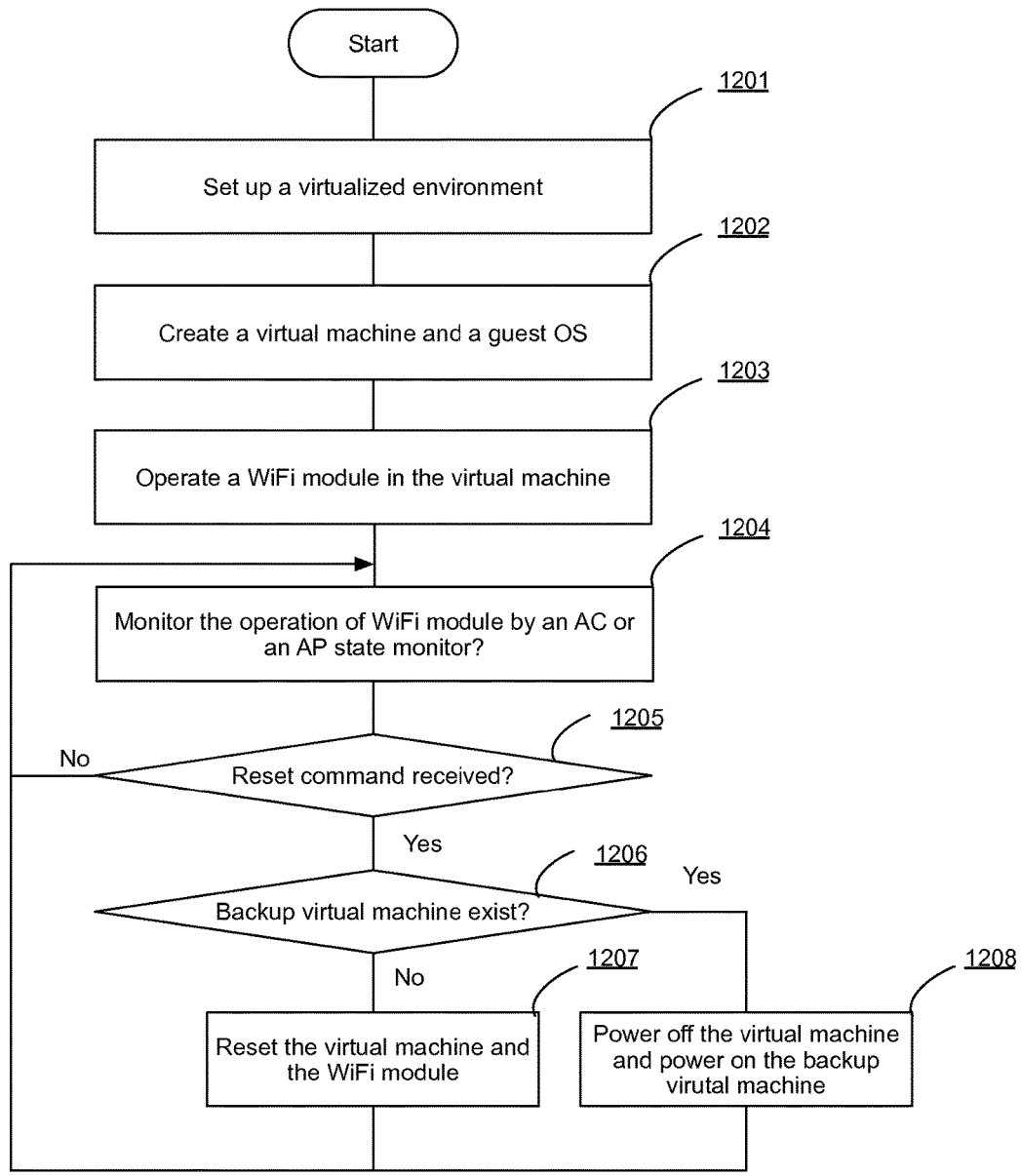
FIG. 12 is a flow diagram illustrating a method for managing an access point remotely in accordance with an embodiment of the present invention.

FIG. 12 is a flow diagram illustrating a method for managing an access point remotely in accordance with an embodiment of the present invention.

At block 1201, a virtualized environment is setup. In one embodiment, the virtualized environment may be a virtualization application running on a host operating system. In another embodiment, the virtualized environment may be a bare-metal hypervisor that is running on top of hardware. It is clear to a person skilled in the art will appreciate that other type of virtual environments may also be used for hosting one or more guest OSs.

At block 1202, a virtual machine and a guest OS are created in the virtualized environment. The guest OS is used for hosting a Wi-Fi module of the wireless AP that provides Wi-Fi services to Wi-Fi-enabled clients. A backup virtual machine, which may be a copy or a clone of the active guest OS may also be created and activated in case the current active guest OS fails. Another guest OS that hosts the modules that monitoring and managing the guest OS on which the Wi-Fi module is running may also be created on a bare-metal hypervisor. Most of the resources of the wireless AP may be allocated to the guest OS hosting the Wi-Fi module and only limited resources are reserved for a hypervisor, a host OS or other guest OSs of the AP.

At block 1203, a Wi-Fi module is started on the active guest OS to provide Wi-Fi services to Wi-Fi-enabled clients. In some embodiments, a CAPWAP tunnel may be established between the Wi-Fi module which is running on the guest OS and an AC which controls the Wi-Fi network. Data packets transmitted to/from the Wi-Fi-enabled clients are transferred through the CAPWAP from/to the AC. In other embodiments, a CAPWAP tunnel is established between the AC and the host OS and an internal connection is established between the host OS and the guest OS. Data packets transmitted to/from the Wi-Fi-enabled clients are transferred through the internal connection between the guest OS and the host OS and then the packets are transferred through the CAPWAP from/to the AC.

At block 1204, the operation of the Wi-Fi module running on the guest OS is monitored by the AC or a wireless AP state monitor which may be running on a host OS, another guest OS or a hypervisor. The AC may detect the status of the Wi-Fi module through an echo request that is periodically sent by the AC to Wi-Fi module of the wireless AP through the CAPWAP control channel. If no echo response is received from the Wi-Fi module, the AC may determine that the Wi-Fi module has failed. The AC may also send ping request to the guest OS periodically. If no ping response is received, the AC may determine that the guest OS has failed. The wireless AP state monitor that resides on the host OS, another guest OS or hypervisor may monitor the status of the active virtual machine on which the Wi-Fi module is running through corresponding VM status APIs provided by the hypervisor or virtualization application. When a failure of the guest OS or Wi-Fi module is detected, the AC or the wireless AP state monitor may send a reset command or other commands to a wireless AP management console of the AP. The AP management console may operate the guest OS according to the commands received from the AC or the AP state monitor and the Wi-Fi services may be resumed. As the wireless AP management console does not reside in the same guest OS where the Wi-Fi module resides, the failure of the guest OS where the Wi-Fi module resides will not affect the wireless AP management console and the Wi-Fi service may be resumed or fixed by the AC through a channel with the AP management console that is available even when the guest OS has failed.

At block 1205, the wireless AP management console determines if a reset command is received from the AC or wireless AP state monitor. If no command is received at the wireless AP management console, the process goes back to block 1204 and continues monitoring the operation of Wi-Fi module. If a reset command is received, the wireless AP management console may further determine if a backup virtual machine, which is a copy or clone of the current active virtual machine, exists at block 1206. If no backup virtual machine exists, the active virtual machine may be reset by the wireless AP management console through corresponding power management API provided by the hypervisor or virtualization application at block 1207. If a backup virtual machine exists, then the current virtual machine may be powered off and the backup virtual machine may be powered on by the wireless AP management console at block 1208. The Wi-Fi module running on the newly activated virtual machine will be started to provide Wi-Fi service.

Figure 13:
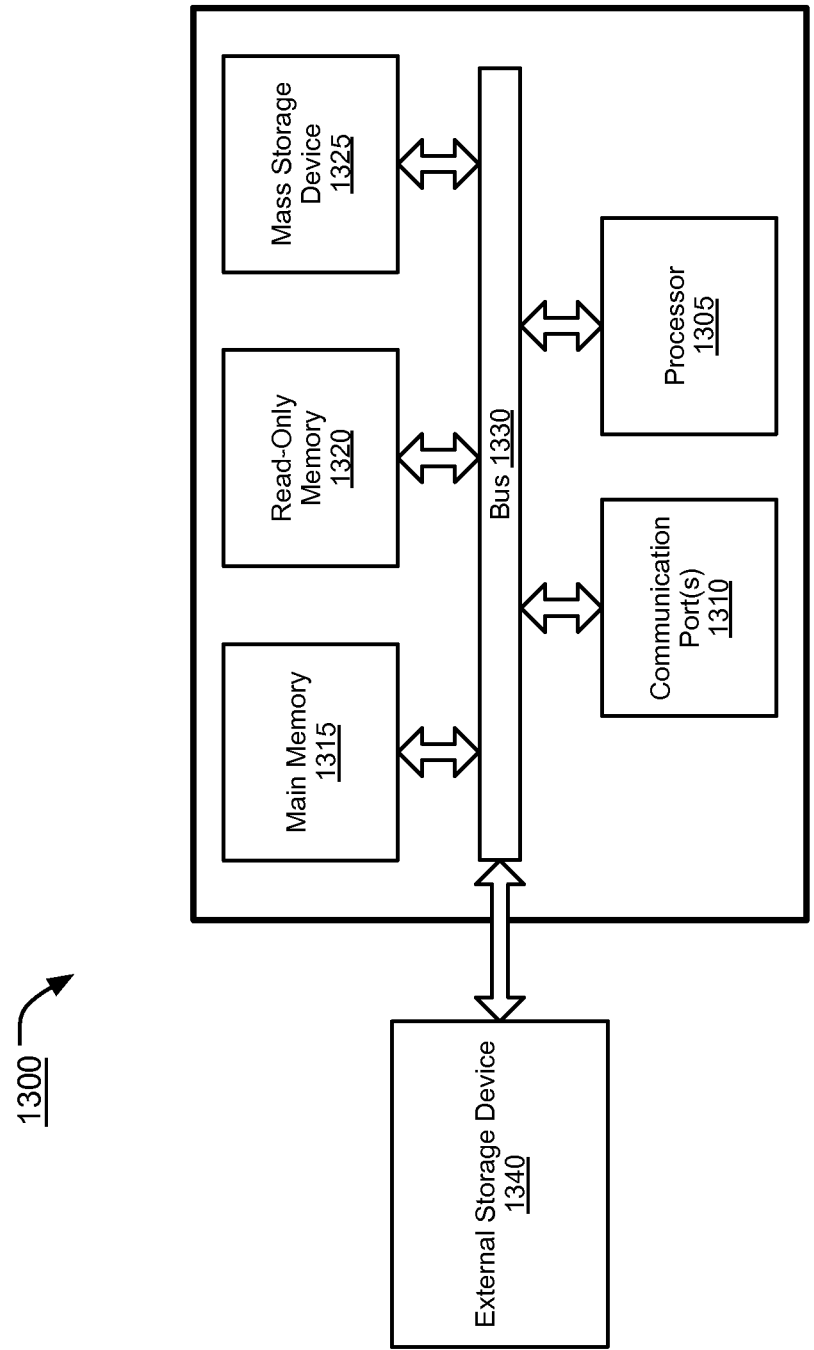
FIG. 13 is an exemplary computer system in which or with which embodiments of the present invention may be utilized.

FIG. 13 is an example of a computer system 1300 with which embodiments of the present disclosure may be utilized. Computer system 1300 may represent or form a part of a network appliance, a server or a client workstation.

Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 1300 includes a bus 1330, a processor 1305, communication port 1310, a main memory 1315, a removable storage media 1340, a read only memory 1320 and a mass storage 1325. A person skilled in the art will appreciate that computer system 1300 may include more than one processor and communication ports.

Examples of processor 1305 include, but are not limited to, an Intel® Itanium® or Itanium 2 processor(s), or AMD®, Opteron® or Athlon MP® processor(s), Motorola® lines of processors, FortiSOC™ system on a chip processors or other future processors. Processor 1305 may include various modules associated with embodiments of the present invention.

Communication port 1310 can be any of an RS-232 port for use with a modem based dialup connection, a 10/100 Ethernet port, a Gigabit or 10 Gigabit port using copper or fiber, a serial port, a parallel port, or other existing or future ports. Communication port 1310 may be chosen depending on a network, such a Local Area Network (LAN), Wide Area Network (WAN), or any network to which computer system 1300 connects.

Memory 1315 can be Random Access Memory (RAM), or any other dynamic storage device commonly known in the art. Read only memory 1320 can be any static storage device(s) such as, but not limited to, a Programmable Read Only Memory (PROM) chips for storing static information such as start-up or BIOS instructions for processor 1305.

Mass storage 1325 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 1330 communicatively couples processor(s) 1305 with the other memory, storage and communication blocks. Bus 1330 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1305 to system memory.

Optionally, operator and administrative interfaces, such as a display, keyboard, and a cursor control device, may also be coupled to bus 1330 to support direct operator interaction with computer system 1300. Other operator and administrative interfaces can be provided through network connections connected through communication port 1310.

Removable storage media 1340 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A wireless access point (AP) comprising:
    a host hardware platform comprising:
        at least one central processing unit (CPU);
        at least one memory including code, which when executed by the at least one CPU provides wireless connectivity to at least one wireless client;
        a radio frequency (RF) transceiver providing a wireless connection to the at least one wireless client;
        a network adaptor connecting the wireless AP to a network;
    a hypervisor providing a first virtual machine for hosting a first guest operating system (OS) configured to run on the first virtual machine;
    a wireless module configured to run on the first guest OS for managing the wireless connection to the at least one wireless client; and
    a wireless AP management console configured to run on the wireless AP outside of the first guest OS and configured to manage operations of the wireless module and the first guest OS, wherein the wireless AP management console provides a remote wireless AP controller (AC) with an ability to remedy a failure associated with the wireless module by resetting the first guest OS responsive to direction from the AC.

2. The wireless AP of claim 1, wherein
    the wireless AP management console is configured to receive a command from the AC that is configured to control the AP; wherein the command indicates an operation that the AC intends the first guest OS or the wireless module to execute; and
    the wireless AP management console causes the operation to be executed by the first guest OS or the wireless module.

3. The wireless AP of claim 2, wherein the command is any one of a reset command, a power off command, a power on command, a power cycle command, a debug command or a log transfer command.

4. The wireless AP of claim 2, wherein the wireless AP management console is configured to run on any one of the hypervisor, another guest OS and a host OS.

5. The wireless AP of claim 1, further comprising a wireless AP state monitor which resides on the wireless AP but outside of the first guest OS for monitoring the state of the first guest OS or the wireless module; wherein the wireless AP state monitor is configured to send a command controlling the first guest OS or the wireless module to the wireless AP management console based on the state of the first guest OS or the wireless module.

6. The wireless AP of claim 5, wherein the wireless AP state monitor is configured to run on any one of the hypervisor, another guest OS and a host OS.

7. The wireless AP of claim 1, further comprising a backup virtual machine that is a clone of the first virtual machine; wherein the backup virtual machine is in a suspended or power off state when the first virtual machine is running; and wherein the backup virtual machine is activated by the wireless AP management console when the first virtual machine is powered off so that a wireless module on the backup virtual machine replaces the wireless module on the first virtual machine to manage the wireless connection to the at least one wireless client.

8. The wireless AP of claim 1, wherein the wireless AP is a dual-band wireless AP that comprises:
a first wireless module, configured to run on the first guest OS hosted by the first virtual machine, for managing wireless connectivity via a first radio band; and
a second wireless module, configured to run on a second guest OS hosted by a second virtual machine, for managing wireless connectivity via a second radio band.

9. The wireless AP of claim 1, further comprising a host OS; wherein
the first guest OS is configured to run within the host OS;
the wireless AP management console is configured to run on the host OS;
the host OS is a thin OS and more resources of the wireless AP are allocated to the first guest OS than are allocated to the host OS.

10. The wireless AP of claim 1, wherein
a tunnel is established between the AC and the first guest OS and data messages and control messages are transferred directly between the wireless module and the AC;
a connection is established between the AC and the wireless AP management console responsive to detecting the failure; and
the wireless AP management console that is running on a host OS is configured to receive a command for controlling the first guest OS or wireless module from the AC through the connection.

11. The wireless AP of claim 1, wherein
a tunnel is established between the AC and a host OS that hosts the first guest OS;
an internal connection is established between the host OS and the first guest OS;
data messages and control messages are transferred between the host OS and the AC;
the data messages and control messages are transferred to the first guest OS through the internal connection; and
the wireless AP management console that is running on the host OS is configured to receive a command for controlling the first guest OS or wireless module from the AC through the tunnel.

12. The wireless AP of claim 1, wherein the hypervisor comprises a bare-metal hypervisor or a hosted hypervisor.

13. A method comprising:
setting up a virtualized environment on a wireless access point (AP);
creating a first virtual machine and a first guest operating system (OS) within the virtualized environment;
operating a wireless module on the first guest OS for managing the wireless connection to the at least one wireless client; and
managing operations of the wireless module and the first guest OS by a wireless AP management console that is running on the wireless AP outside of the first guest OS, wherein the wireless AP management console provides a remote wireless AP controller (AC) with an ability to remedy a failure associated with the wireless module by resetting the first guest OS responsive to direction from the AC.

14. The method of claim 13, further comprising:
receiving a command by the wireless AP management console from the AC that is configured to control the AP; wherein the command indicates an operation that the AC intends to be executed by the first guest OS or the wireless module; and
causing, by the wireless AP management console, the operation to be executed by the first guest OS or the wireless module.

15. The method of claim 14, wherein the command is any one of a reset command, a power off command, a power on command, a power cycle command, a debug command or a log transfer command.

16. The method of claim 14, wherein the wireless AP management console is configured to run on any one of a hypervisor, another guest OS and a host OS.

17. The method of claim 13, further comprising:
monitoring a state of the first guest OS or the wireless module by a wireless AP state monitor residing on the wireless AP outside the first guest OS; and
sending a command controlling the first guest OS or the wireless module to the wireless AP management console based on the state of the first guest OS or the wireless module.

18. The method of claim 17, wherein the wireless AP state monitor is configured to run on any one of a hypervisor, another guest OS and a host OS.

19. The method of claim 13, further comprising:
creating a backup virtual machine that is a clone of the first virtual machine; wherein the backup virtual machine is in a suspended or a power off state when the first virtual machine is running; and
activating the backup virtual machine by the wireless AP management console when the first virtual machine is powered off so that a wireless module on the backup virtual machine replaces the wireless module on the first virtual machine to manage the wireless connection to the at least one wireless client.

20. The method of claim 13, wherein the wireless AP is a dual-band wireless AP and the method further comprising:
managing wireless connectivity via a first radio band of the dual-band wireless AP by a first wireless module that is configured to run on the first guest OS hosted by the first virtual machine; and managing wireless connectivity via a second radio band of the dual-band wireless AP by a second wireless module that is configured to run on a second guest OS hosted by a second virtual machine.

21. The method of claim 13 further comprising:
creating the first guest OS within a host OS;
allocating more resources of the wireless AP to the first guest OS than are allocated to the host OS; and
running the wireless AP management console on the host OS.

22. The method of claim 13, further comprising
establishing a tunnel between the AC and the first guest OS;
transferring data messages and control messages directly between the wireless module and the AC;
establishing a connection between the AC and the wireless AP management console when the AC cannot control the wireless module; and
receiving a command for controlling the first guest OS or wireless module by the wireless AP management console from the AC through the connection.

23. The method of claim 13, further comprising:
establishing a tunnel between an AC and a host OS that hosts the first guest OS;
establishing an internal connection between the host OS and the first guest OS;
transferring data messages and control messages between the host OS and the AC;
transferring the data messages and control messages to the first guest OS through the internal connection; and
receiving a command for controlling the first guest OS or wireless module by the wireless AP management console on the host OS from the AC through the tunnel.

24. The method of claim 13, wherein the virtualized environment comprises a bare-metal hypervisor or a hosted hypervisor.

* * * * *